US010122926B2

(12) United States Patent
Okada

(10) Patent No.: US 10,122,926 B2
(45) Date of Patent: Nov. 6, 2018

(54) ELECTRONIC APPARATUS, CONTROL METHOD THEREFOR, AND STORAGE MEDIUM STORING PROGRAM

(71) Applicant: CANON KABUSHIKI KAISHA, Tokyo (JP)

(72) Inventor: Koichi Okada, Kunitachi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/081,675

(22) Filed: Mar. 25, 2016

(65) Prior Publication Data

US 2016/0295105 A1 Oct. 6, 2016

(30) Foreign Application Priority Data

Mar. 31, 2015 (JP) ................................ 2015-073182

(51) Int. Cl.

| | |
|---|---|
| ***H04N 5/232*** | (2006.01) |
| ***G06F 3/0482*** | (2013.01) |
| ***G06F 3/0484*** | (2013.01) |
| ***G06F 3/023*** | (2006.01) |

(52) U.S. Cl.

CPC ....... *H04N 5/23293* (2013.01); *G06F 3/0238* (2013.01); *G06F 3/0482* (2013.01); *G06F 3/04847* (2013.01); *H04N 5/232* (2013.01)

(58) Field of Classification Search

CPC .. G06F 3/0482; G06F 3/04847; G06F 3/0238; H04N 5/232; H04N 5/23293

See application file for complete search history.

(56) References Cited

U.S. PATENT DOCUMENTS

2013/0111410 A1* 5/2013 Okada .................. G06F 3/0482 715/841

FOREIGN PATENT DOCUMENTS

| | | | |
|---|---|---|---|
| CN | 101008761 | A | 8/2007 |
| CN | 101656834 | A | 2/2010 |
| CN | 103095986 | A | 5/2013 |
| CN | 104243749 | A | 12/2014 |
| JP | 2011-159180 | A | 8/2011 |
| JP | 2015-039143 | A | 2/2015 |

* cited by examiner

*Primary Examiner* — Twyler Haskins
*Assistant Examiner* — Carramah J Quiett
(74) *Attorney, Agent, or Firm* — Canon U.S.A., Inc. IP Division

(57) ABSTRACT

A timer is activated when a menu button is pressed, and a setting screen for customizing a function of an assign button is displayed when the assign button is pressed before a period of the timer expires with the menu button being pressed. On the other hand, when the assign button is pressed first, even if the menu button is pressed with the assign button being pressed, the function of the assign button is executed, and the setting screen for customizing the function of the assign button is not displayed.

23 Claims, 6 Drawing Sheets

Sub Menu

AAAAAA
BBBBBB
CCCCCC
DDDDDD
Camera Assign Buttons
Remote Assign Buttons

ELECTRONIC APPARATUS, CONTROL METHOD THEREFOR, AND STORAGE MEDIUM STORING PROGRAM

BACKGROUND OF THE INVENTION

Field of the Invention

The present disclosure generally relates to electronics and, more particularly, to an electronic apparatus that is particularly suitable for use in customizing an operation key, a control method for the electronic apparatus, and a storage medium storing a program.

Description of the Related Art

Electronic apparatuses have more functions in recent years. For example, many professional-use video cameras have more functions and more detailed settings thereof can be made in comparison with consumer-use video cameras so as to support various intended uses. In the professional-use video cameras, function setting methods are a method in which setting is carried out by using keys on an outer casing, and a method in which setting is carried out through a user interface (UI), such as a menu displayed on a display device.

Included among keys on an outer casing is an assign button (user customization button) through which a user can change a function according to how he or she uses an apparatus. In some cases, a function that the user wants to assign to an assign button disposed at a position at which the assign button is readily manipulated differs according to usage conditions of the apparatus (differs according to scenes to be shot in the case of an image capturing apparatus). Hence, changing a function assignment of the assign button quickly and easily makes the apparatus convenient to use. A method of assigning a function to the assign button is a method in which a setting menu screen for the apparatus is opened, a menu item to be customized is selected, a button that the user wants to customize and a function that he or she wants to assign are selected, and thus setting is carried out. However, this increases the number of operation steps if there are many items and a multilevel hierarchy in a setting menu.

Japanese Patent Laid-Open No. 2011-159180 proposes a method in which, in order that a function assignment of a button on a touch panel can be changed without opening a menu screen, a timer is activated when a button is touched, and a shift to an operation mode in which a function of the button is customized is performed when the touch is released after the expiry of the timer. That is, in Japanese Patent Laid-Open No. 2011-159180, a long press of a touch button enables a shift to the operation mode in which customization is performed. A long press herein is to press and hold a button down for a while.

However, as in the technique disclosed in Japanese Patent Laid-Open No. 2011-159180, a method in which a shift to an operation mode in which customization is performed can be performed by a long press of a button has the following problems. That is, if a function assigned to the button is a function to be executed for the duration of operation of the button, the function assigned to the button being operated is executed before a shift to the operation mode in which customization is performed is performed. Under such circumstances, in the case where a user presses the button with the mere intention of performing a shift to the operation mode in which customization is performed, the function of the button that the user does not intend to execute is executed. On the other hand, when a shift to the operation mode in which customization is performed is performed in response to a long press of the button, execution of the function assigned to the button is interrupted despite the fact that the button continues to be operated. Under such circumstances, in the case where the user presses the button with the intention of continuously executing the function assigned to the button, execution of the function is interrupted at a point in time when the user least expects it to be interrupted.

SUMMARY OF THE INVENTION

The present disclosure prevents an operation that a user does not intend to perform from being performed and enables a setting screen for customizing a function of a button to be readily displayed.

According to an aspect of the present disclosure, an electronic apparatus includes: a first type of operation member in which any of a plurality of functions can be registered; a second type of operation member which is a member different from the first type of operation member, and in which a function is registered in advance; a registration unit configured to register any of the plurality of functions in the first type of operation member; and a control unit configured to perform control so that a function registered in the first type of operation member is executed based on a fact that the first type of operation member is operated without the second type of operation member being operated, and so that, if the first type of operation member is operated while the second type of operation member continues to be operated after the second type of operation member is operated, the function registered in the first type of operation member is not executed, and a setting screen which is a screen on which a function to be registered in the first type of operation member by the registration unit can be selected is displayed.

According to another aspect of the present disclosure, an electronic apparatus includes: a first type of operation member in which any of a plurality of functions can be registered; a second type of operation member which is a member different from the first type of operation member, and in which a function is registered in advance; a registration unit configured to register any of the plurality of functions in the first type of operation member; and a control unit configured to perform control so that, if the second type of operation member is operated before a first period has elapsed with the first type of operation member being operated since the first type of operation member was operated without the second type of operation member being operated, a function registered in the first type of operation member is not executed, and a setting screen is displayed, so that the function registered in the first type of operation member is executed in response to a fact that the first period has elapsed with the first type of operation member being operated since the first type of operation member was operated without the second type of operation member being operated, and so that, if the first type of operation member is operated before a second period has elapsed with the second type of operation member being operated since the second type of operation member was operated without the first type of operation member being operated, the function registered in the first type of operation member is not executed, and the setting screen is displayed.

Further features of the present disclosure will become apparent from the following description of exemplary embodiments (with reference to the attached drawings).

DESCRIPTION OF THE EMBODIMENTS

First Exemplary Embodiment

Figure 1:
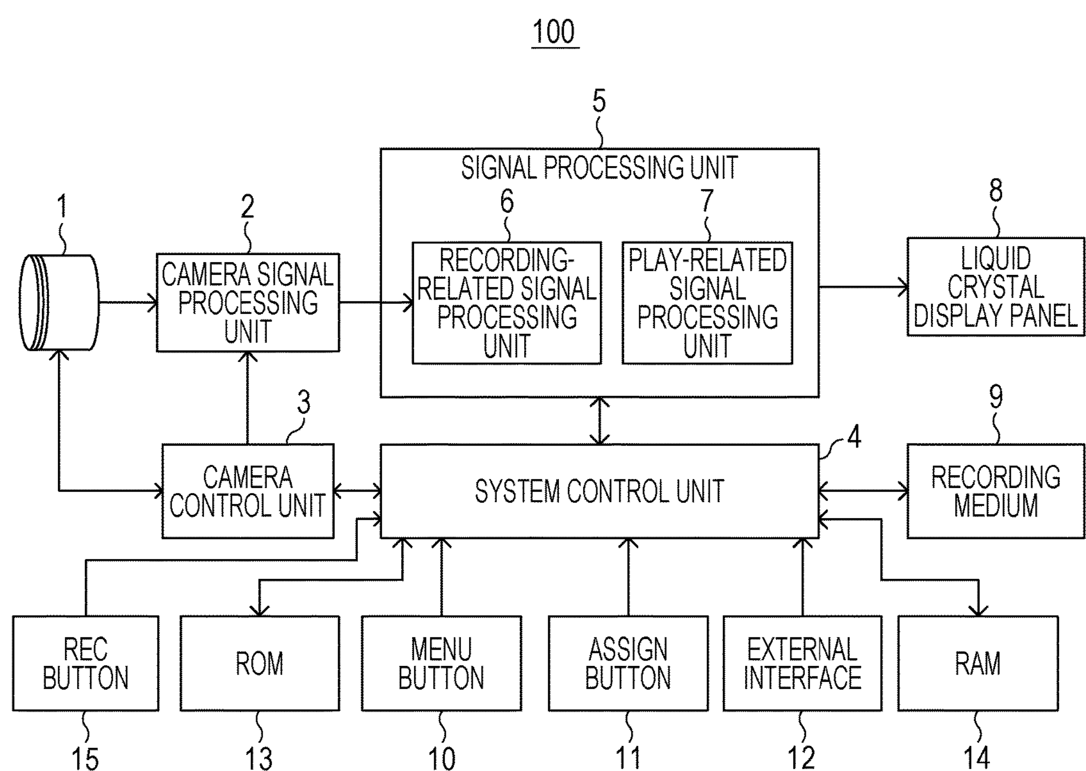
FIG. 1 is a block diagram illustrating an example of the internal structure of a digital video camera according to an exemplary embodiment.

FIG. 1 is a block diagram illustrating an example of the internal structure of a digital video camera 100 according to this exemplary embodiment.

In FIG. 1, an image capturing unit 1 is constituted by an optical system lens, an image capturing element, such as a charge-coupled device (CCD), an autofocus mechanism, a zoom mechanism, and so forth. In accordance with an instruction provided from a camera control unit 3, the image capturing unit 1 adjusts the focus, the amount of light, and so forth with respect to a field to be shot, converts an optical image of the field to be shot that has been formed through the lens into an image signal, and transmits the image signal to a camera signal processing unit 2. The camera control unit 3 is constituted by a microcomputer or the like which may include one or more processors. As used herein, the term “unit” generally refers to any combination of software, firmware, hardware, or other component, such as circuitry, that is used to effectuate a purpose.

A system control unit 4 is constituted by a microcomputer or the like which may include one or more processors, and controls the entire digital video camera 100 in accordance with instructions or the like provided through operation members, such as a menu button 10, an assign button 11, and a REC button 15. A program for performing a process to be described, information on a function assigned to the assign button 11, and so forth are stored on a read only memory (ROM) 13. When the process is performed, the program stored on the ROM 13 is loaded into a random-access memory (RAM) 14, which is a working memory, and the system control unit 4 performs various operations in accordance with the program.

A signal processing unit 5 is constituted by an integrated circuit, a microcomputer, or the like. In accordance with an instruction provided from the system control unit 4, the signal processing unit 5 records an image signal onto a recording medium 9, or performs an operation to play the image signal recorded on the recording medium 9. The signal processing unit 5 also includes a recording-related signal processing unit 6 and a play-related signal processing unit 7, and performs various recording and play signal processing operations in accordance with instructions provided from the system control unit 4. The recording-related signal processing unit 6 performs predetermined signal processing on an image signal output from the camera signal processing unit 2, and records the image signal onto the recording medium 9. The play-related signal processing unit 7 performs predetermined processing on an image signal played from the recording medium 9, adds information transmitted from the system control unit 4, such as text information and print area frame display information, to the image signal, and transmits the resultant image signal to a liquid crystal display panel 8.

Under display control of the system control unit 4, the liquid crystal display panel 8 displays an image based on an image signal, and also displays, by letters and symbols, various pieces of information of the digital video camera 100 or a guide to menu setting.

The menu button 10 is a key (a second type of operation member) for opening a menu screen for setting various camera settings. The assign button 11 is a customizable key (a first type of operation member) enabling a user to select a function to be assigned to the key and use it. An external interface 12 is a physical interface for connecting to an external apparatus by using a communication device, such as a Universal Serial Bus (USB), RS232C, RS422, RS485, I2C, or wireless interface. The external apparatus herein is, for example, a personal computer (PC), a remote controller, or a communication terminal, and controls the digital video camera 100 or transfers data through the external interface 12. The REC button 15 is a button for giving an instruction to start or stop shooting.

Figure 2:
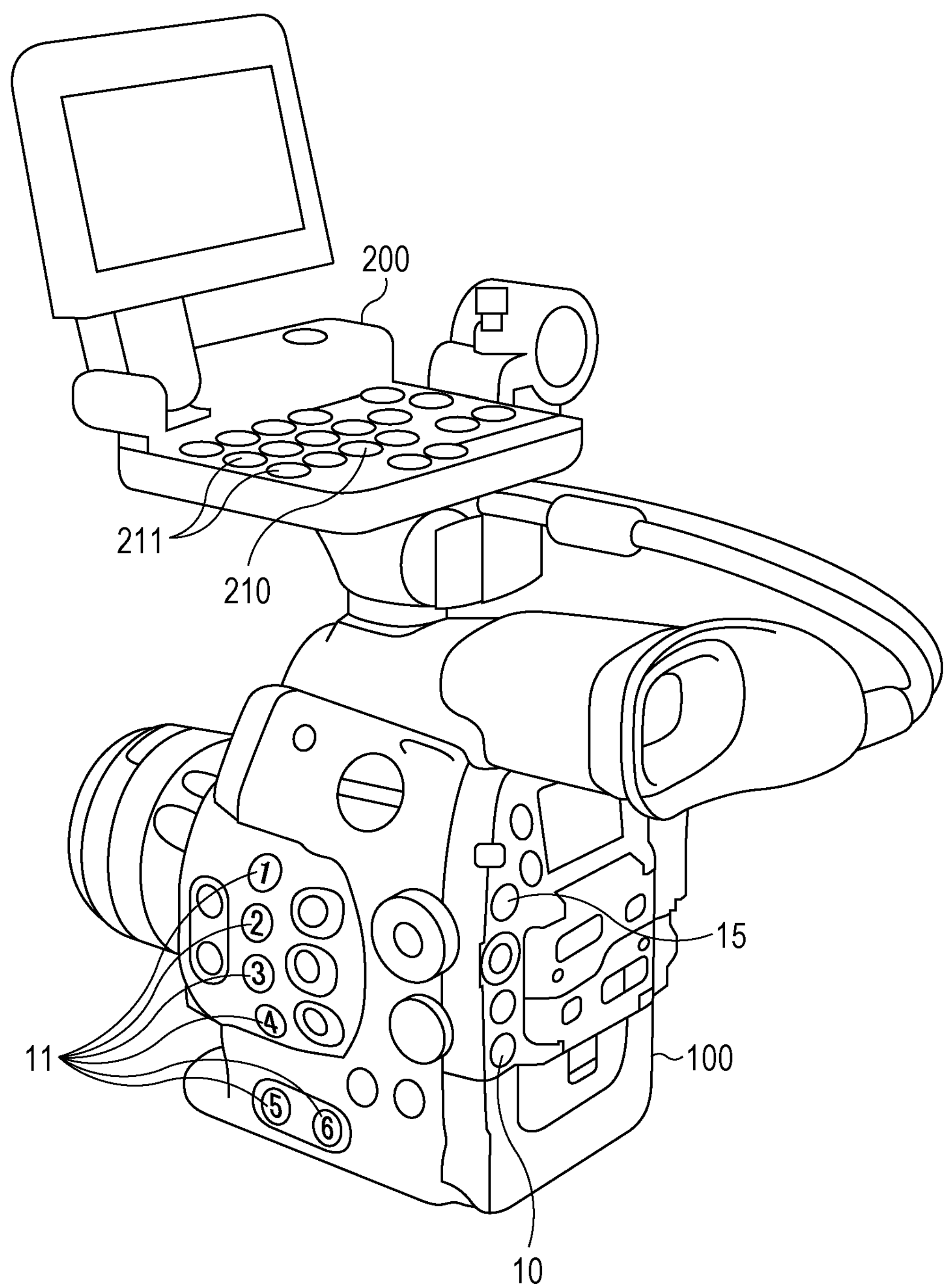
FIG. 2 illustrates an example of the external structure of the digital video camera according to this exemplary embodiment.

FIG. 2 illustrates an example of the external structure of the digital video camera 100 according to this exemplary embodiment. As illustrated in FIG. 2, a plurality of assign buttons 11 are provided on a side of the digital video camera 100. When the user presses the REC button 15, shooting is started, and the user can change shooting conditions or the like by using a customized assign button 11 during shooting. In the case where a function of each assign button 11 is customized, the menu screen is opened by pressing the menu button 10, and a function can be selected. A detailed procedure in which a function of the assign button 11 is customized will be described later.

In the example illustrated in FIG. 2, a display device 200 is connected to the digital video camera 100 through the external interface 12. Similarly, the display device 200 includes a menu button 210 and assign buttons 211, and each assign button 211 can be customized to have a function of controlling the digital video camera 100.

FIGS. 3A to 3E illustrate examples of screens displayed from when the menu screen is opened to when a function to be assigned to the assign button 11 is set. Now, with reference to FIGS. 3A to 3D, there will be described a flow in which a function assignment of the assign button 11 is set after the menu screen is opened in accordance with a typical procedure.

Figure 3A:
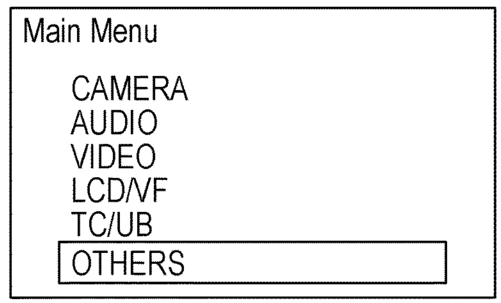
FIGS. 3A to 3E illustrate examples of screens displayed from when a menu screen is opened to when a function to be assigned to an assign button is set.
Figure 3B:
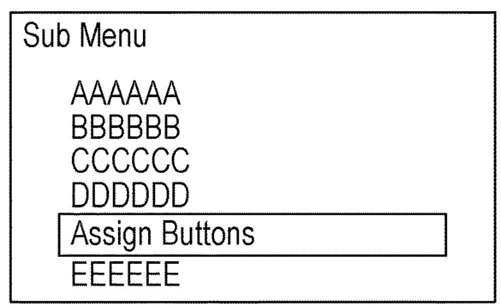
Figure 3C:
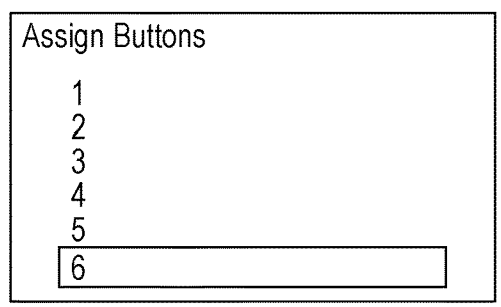
Figure 3D:
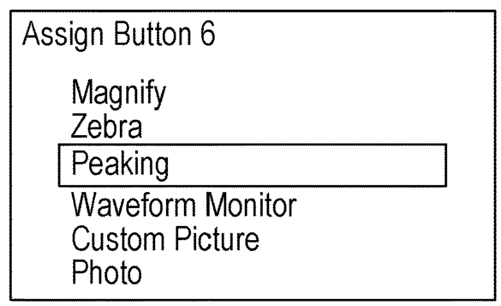

When the menu button 10 is pressed, a topmost-layer screen (a top menu) of the menu screen is displayed on the liquid crystal display panel 8 as illustrated in FIG. 3A. When “OTHERS” is selected on this screen, a lower-layer screen illustrated in FIG. 3B is displayed. If there are a plurality of assign buttons 11, when a setting menu for the assign buttons 11 is selected from this screen, a screen on which an assign button 11 whose setting is to be changed is selected is displayed as illustrated in FIG. 3C. Then, when the assign button 11 whose setting is to be changed is selected, a screen (a setting screen) on which a function that can be registered in the assign button 11 is selected is displayed as illustrated in FIG. 3D. After the function is assigned to the assign button 11, when the assign button 11 is operated, an instruction based on the operation is transmitted to the system control unit 4, and a subsequent operation is performed for each assigned function. That is, the screen of the top menu illustrated in FIG. 3A is part of menus of a hierarchy containing the setting screen illustrated in FIG. 3D, and is the screen of a higher-layer menu than the setting screen.

In the above-described procedure, it takes a lot of time before the setting screen illustrated in FIG. 3D is displayed. Thus, in this exemplary embodiment, simultaneous presses of the menu button 10 and the assign button 11 cause the setting screen to be readily displayed so as to enable a quick change of a function to be customized during shooting or the like.

Figure 4:
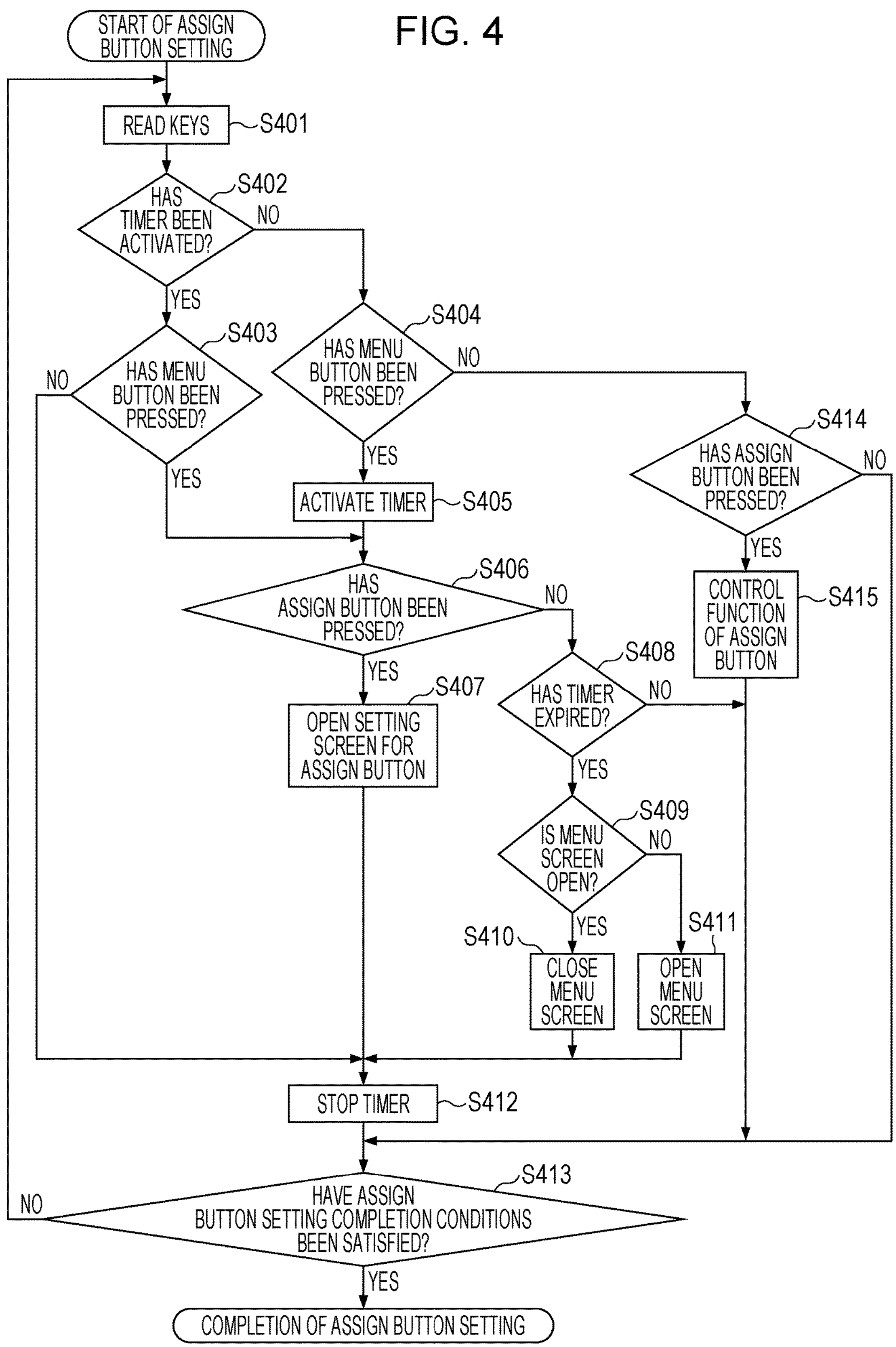
FIG. 4 is a flowchart illustrating an example of a procedure in which a screen on which a function of the assign button is set is displayed in a first exemplary embodiment.

FIG. 4 is a flowchart illustrating an example of a procedure in which a screen on which a function of the assign button 11 is set is displayed in this exemplary embodiment. When a program recorded on the ROM 13 is loaded into the RAM 14, and the system control unit 4 executes the program, the flowchart illustrated in FIG. 4 is implemented. In the example illustrated in FIG. 4, a description will be given with emphasis on a sequence in which a setting menu screen for the assign button 11 is opened by pressing the assign button 11 while holding the menu button 10 down. Furthermore, there also will be described a sequence in which the menu screen is displayed when a certain period has elapsed since only the menu button 10 was operated, and in which a function of the assign button 11 is immediately executed when only the assign button 11 is operated.

First, various keys are monitored, and the states of keys, such as the menu button 10 and the assign button 11, are thereby read in S401. Next, it is determined whether or not a timer to be described has been activated in S402. As a result of this determination, if the timer has not been activated, the flow proceeds to S404. Note that the timer is not operating in an initial state, and the flow therefore proceeds to S404.

Subsequently, the keys read in S401 are checked, and it is determined whether or not the menu button 10 has been pressed in S404. As a result of this determination, if the menu button 10 has been pressed, the flow proceeds to S405, and the timer is activated. The timer is used for monitoring a period from when the menu button 10 is pressed to when the assign button 11 is pressed, and does not have to be activated if the menu button 10 has not been pressed.

Then, the keys read in S401 are checked, and it is determined whether or not the assign button 11 has been pressed in S406. As a result of this determination, if the assign button 11 has been pressed, a setting screen for the assign button 11 is displayed on the liquid crystal display panel 8 in S407, and the timer is stopped in S412. Here, a function assignment screen for the pressed assign button 11 among a plurality of assign buttons 11 is displayed. In this case, a function assigned to the assign button 11 is not executed. This makes a plurality of operation steps in the above-described typical procedure unnecessary, and enables the setting screen to be displayed directly. In S407, for example, the screen illustrated in FIG. 3D is displayed. The example illustrated in FIG. 3D is a screen on which a function to be assigned to "Assign Button 6", which is a pressed button among a plurality of operation buttons contained in the assign buttons 11, can be selected. When this screen is displayed, all a user has to do is to select a function that he or she wants to assign to the Assign Button 6 on this screen and to give a decision instruction (press an enter button, which is not illustrated), thereby enabling the function to be assigned to the pressed assign button. That is, when the system control unit 4 accepts the decision instruction (a press of the enter button, which is not illustrated) after the screen illustrated in FIG. 3D is displayed, the system control unit 4 stores the function selected at that point in time on the ROM 13 in association with "Assign Button 6". Then, the setting screen is closed, and the flow proceeds to S412.

On the other hand, as a result of the determination made in S406, if the assign button 11 has not been pressed, it is determined whether or not a period of the timer has expired in S408. As a result of this determination, if the period of the timer has expired, it is determined whether or not a menu screen is displayed on the liquid crystal display panel 8 in S409. As a result of this determination, if the menu screen is displayed, an operation of closing the menu screen is performed in S410, and the timer is stopped in S412. On the other hand, as a result of the determination made in S409, if the menu screen is not displayed, an operation of displaying the menu screen is performed in S411, and the flow proceeds to S412.

On the other hand, as a result of the determination made in S408, if the period of the timer has not expired, it is determined whether or not assign button setting completion conditions have been satisfied in S413. Examples of the case where the assign button setting completion conditions are satisfied include the case where a power supply of the digital video camera 100 is turned off, the case where an operation mode is switched, and other cases. As a result of this determination, if no completion conditions have been satisfied, the flow returns to S401, and the process is continuously performed. Note that a loop from S413 to S401 is performed at a predetermined sampling frequency. On the other hand, as a result of the determination made in S413, if the completion conditions have been satisfied, the process ends.

On the other hand, as a result of the determination made in S402, if the timer has been activated, that is, if the timer has already been activated after the menu button 10 was pressed, the keys read in S401 are checked, and it is determined whether or not the menu button 10 has been pressed in S403. That is, it is determined whether or not the menu button 10 is held down after the timer has been activated. As a result of this determination, if the menu button 10 has been pressed, the flow proceeds to S406. Then, an operation based on simultaneous presses of the menu button 10 and the assign button 11, or an operation based on the case where only the menu button 10 has been pressed is performed.

That is, if the menu button 10 is held down singly for a certain time period that elapses before the period of the timer expires, a menu button 10's own particular function (the operation of displaying or closing the menu screen) is performed. On the other hand, if the menu button 10 is held down and the assign button 11 is also pressed within the certain time period that elapses before the period of the timer expires, displaying of the setting screen for the assign button 11 is performed as the operation based on simultaneous presses in S407.

On the other hand, as a result of the determination made in S403, if the menu button 10 has not been pressed, the flow proceeds to S412 so as to end this control temporarily, and the timer is stopped. The subsequent operation is as described above.

On the other hand, as a result of the determination made in S404, if the menu button 10 has not been pressed, that is, if the timer has not been activated and the menu button 10 has not been pressed, the flow proceeds to S414. Then, the keys read in S401 are checked, and it is determined whether or not the assign button 11 has been pressed in S414. As a result of this determination, if the assign button 11 has been pressed, an operation of a function assigned to the pressed assign button is executed in S415. On the other hand, as a result of the determination made in S414, if the assign button 11 has not been pressed, the flow proceeds to S413 described above.

Now, functions that can be assigned to the assign button 11 will be described. The functions are a function that is executed immediately when the assign button 11 is pressed and before it is released on the precondition that it is long pressed (pressed and held down for a while), and a function that is executed in response to the release of a single press of the assign button 11. In the case of, for example, a function called "ONE-SHOT AF" of adjusting focus, the digital video camera 100 operates at a setting of autofocus while the assign button 11 is pressed and held down, and the setting is returned to manual focus when the long press of the assign button 11 is released. In the case of a professional-use digital video camera, in particular, it is desirable to specify that an assign button is long pressed intentionally for the event of an interruption of focusing operation, and thus such a function can be assigned. Likewise, in the case of a function called "PUSH AUTO IRIS" of adjusting an aperture, the digital video camera 100 operates in an auto iris mode while the assign button 11 is pressed and held down, and the mode is returned to a manual mode when the long press is released. Execution of each of these functions is started in response to the start of operation of the assign button 11, and the execution is finished in response to the completion of the operation of the assign button 11. It is important that these functions regarding image capturing be executed as soon as the assign button 11 is operated in order to perform shooting corresponding to a moving subject. On the other hand, examples of a function that is executed in response to the release of a single press of the assign button 11 include "AF LOCK", "BACKLIGHT", and "USER SETTING".

A long press is not essential, and there is a function that is executed by either a single press or a long press. In the case of, for example, "HEADPHONE+/−", volume can be changed by a predetermined amount after a single press is made, and, if a long press is made, volume can be changed significantly after a certain time period has elapsed since the long press was started. Note that, even if a long press is made, in the case where the long press is released before the certain time period has elapsed, volume is changed by the predetermined amount, as in a single press, after the long press is released. In addition, the same applies to "IRIS+/−", "AE Shift+/−", and so forth in the manual mode.

In the operation in S415, in the case of a function associated with a long press, the operation in S415 is performed while a long press is held, the state of the assign button 11 is monitored at all times, and the operation is continued until the long press is released. In the case of a function that is executed in response to the release of a single press, the state of the assign button 11 is monitored at all times, an operation corresponding to the function is performed at a point in time when the assign button 11 is released, and then the flow proceeds to S413. Thus, since the flow does not proceed to S413 while the assign button 11 is long pressed (continues to be operated), even if the menu button 10 is pressed during this time period, the setting screen for the assign button 11 is not displayed.

As described above, in this exemplary embodiment, since there is a function that is executed while a long press is held, in accordance with the procedure illustrated in FIG. 4, the setting screen for the assign button 11 cannot be displayed even if the menu button 10 is pressed while the assign button 11 is long pressed.

In the above-described process, the case is described where the menu button 10's own particular function (the operation of displaying or closing the menu screen) is performed in response to the fact that the menu button 10 is held down singly for the certain time period that elapses before the period of the timer expires. In addition to this, the above-described menu button 10's own particular function may be performed in response to the fact that only the menu button 10 is pressed singly and the press of the menu button 10 is not detected within the certain time period that elapses before the period of the timer expires.

As described above, according to this exemplary embodiment, simple operation enables the setting screen for an assign button to be displayed.

Second Exemplary Embodiment

A second exemplary embodiment of the present disclosure will be described below. In this exemplary embodiment, there will be described the case where a first timer is activated when a menu button is pressed, and also where a second timer is activated when an assign button is pressed first. This exemplary embodiment differs from the first exemplary embodiment in that, even if either the menu button or the assign button is pressed first, the setting screen for the assign button can be displayed. Note that the structure of a digital video camera according to this exemplary embodiment and functions that can be assigned to the assign button are the same as those in the first exemplary embodiment, and thus descriptions thereof are omitted. Only differences from the first exemplary embodiment will be described below.

Figure 5A:
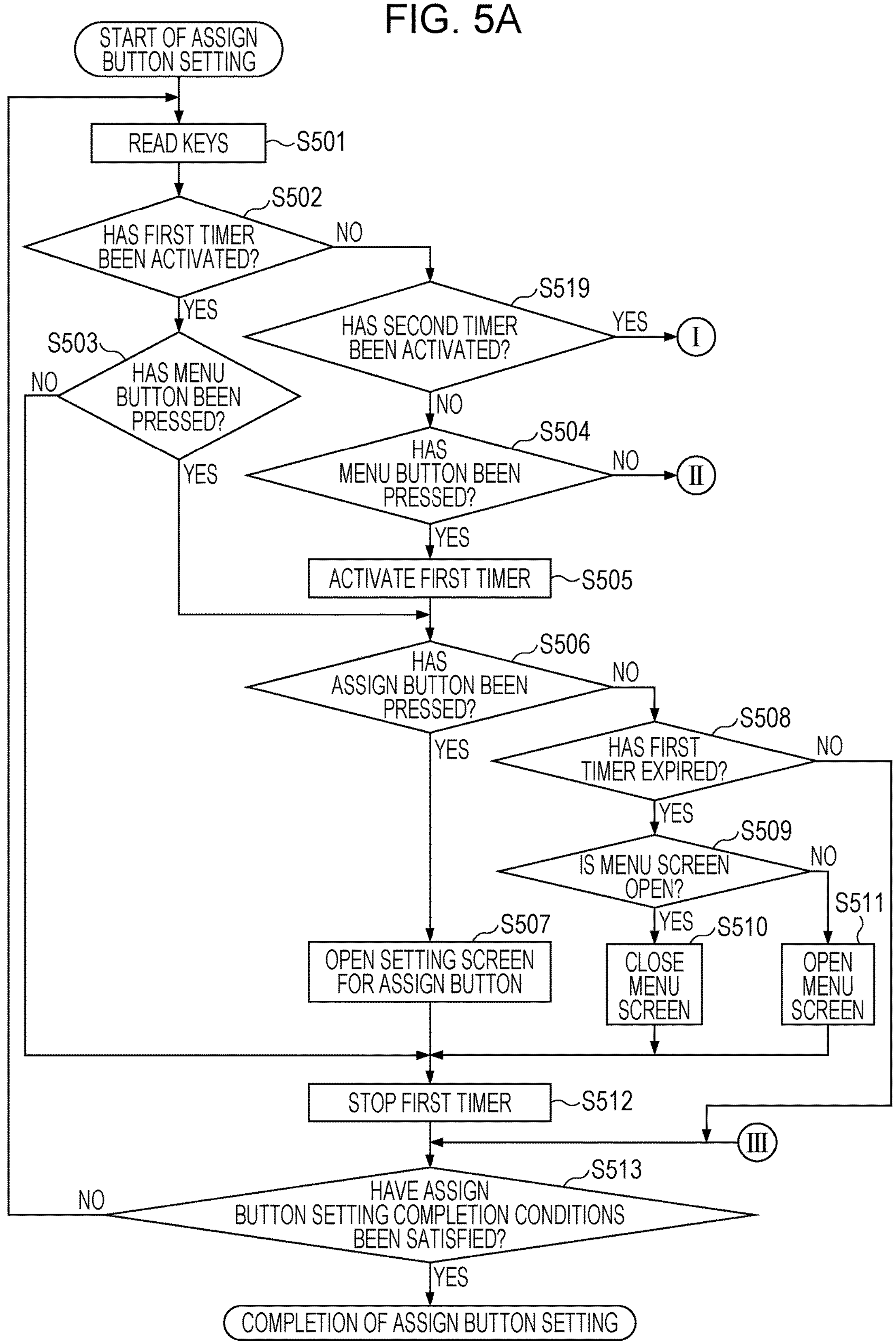
FIGS. 5A and 5B illustrate a flowchart of an example of a procedure in which a screen on which a function of the assign button is set is displayed in a second exemplary embodiment.
Figure 5B:
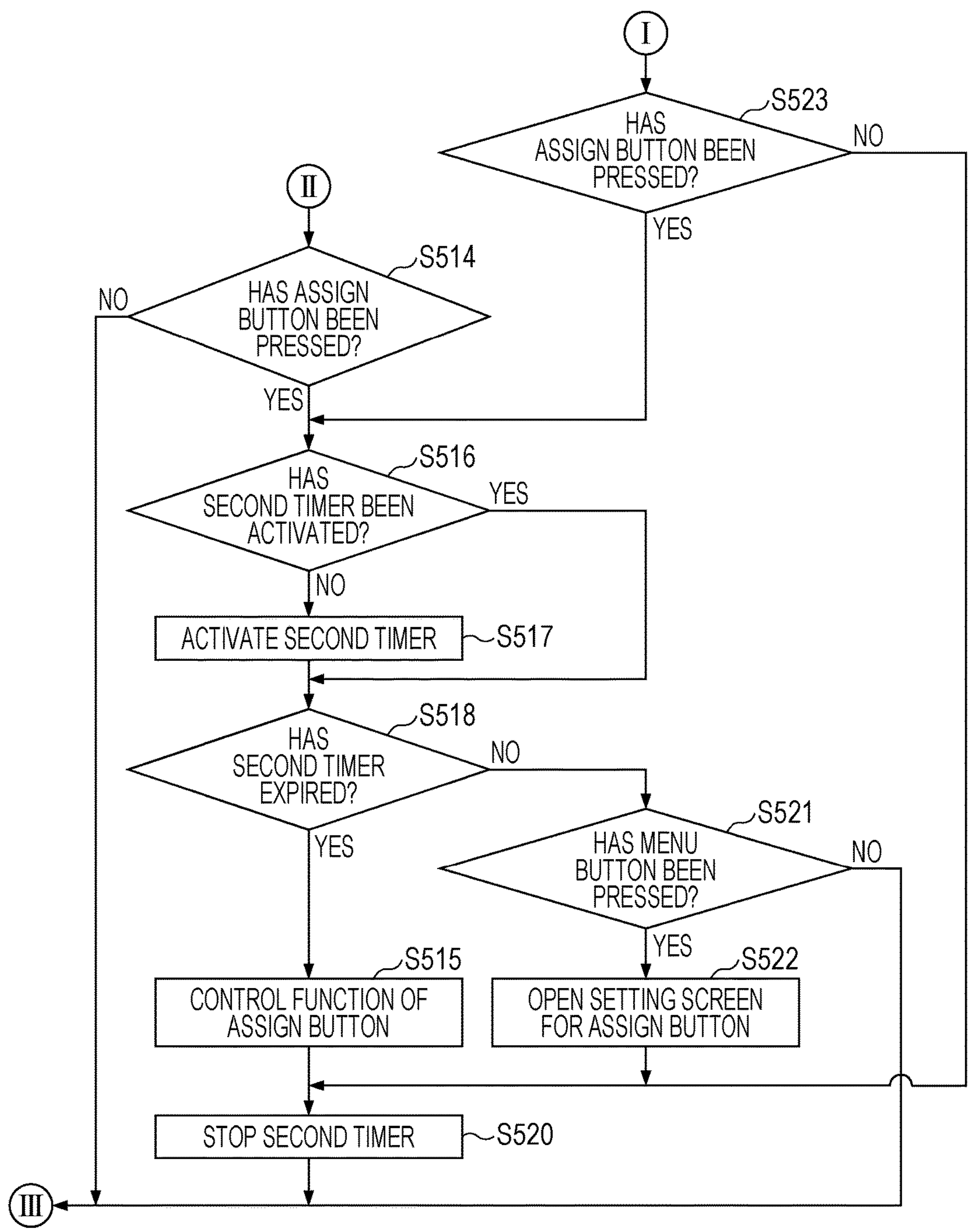

FIGS. 5A and 5B illustrate a flowchart of an example of a procedure in which a screen on which a function of the assign button 11 is set is displayed in this exemplary embodiment. When a program recorded on the ROM 13 is loaded into the RAM 14, and the system control unit 4 executes the program, the flowchart illustrated in FIGS. 5A and 5B is implemented. In FIGS. 5A and 5B, operations in S501 to S515 are the same as the respective operations in S401 to S415 in FIG. 4, and detailed descriptions thereof are omitted. Note that the timer in FIG. 4 is represented as a first timer in FIGS. 5A and 5B. In this exemplary embodiment, a description will be given with emphasis on operations constituting a sequence different from the process illustrated in FIG. 4.

As a result of a determination made in S502, if the first timer has not been activated, that is, if the menu button 10 has not yet been pressed, it is determined whether or not the second timer has been activated in S519. The second timer herein is used for monitoring a period from when the assign button 11 is pressed to when the menu button 10 is pressed, and does not have to be activated if the assign button 11 has not been pressed. Additionally, if the assign button 11 is pressed with the menu button 10 being pressed, the setting screen for the assign button 11 is displayed as in the first exemplary embodiment, and thus the second timer is not activated under such circumstances.

As a result of the determination made in S519, if the second timer has not been activated, it is determined that the assign button 11 has not yet been pressed, and thus the flow proceeds to S504. Then, as a result of a determination made in S504, if the menu button 10 has not been pressed, it is determined whether or not the assign button 11 has been pressed in S514, and, if the assign button 11 has not been pressed, the flow proceeds to S513.

On the other hand, as a result of the determination made in S514, if the assign button 11 has been pressed, it is determined whether or not the second timer has been activated in S516. As a result of this determination, if the second timer has not been activated, the second timer is activated in S517. On the other hand, as a result of the determination made in S516, if the second timer has been activated, the flow proceeds to S518.

Subsequently, it is determined whether or not a period of the second timer has expired in S518. As a result of this determination, if the period of the second timer has expired, an operation of a function assigned to the assign button 11 is executed in S515. On the other hand, as a result of the determination made in S518, if the period of the second timer has not expired, the keys read in S501 are checked, and it is determined whether or not the menu button 10 has been pressed in S521. As a result of this determination, if the menu button 10 has not been pressed, the flow proceeds to S513. On the other hand, if the menu button 10 has been pressed, the setting screen for the assign button 11 is displayed in S522. Then, the second timer is stopped in S520.

On the other hand, as a result of the determination made in S519, if the second timer has been activated, the keys read in S501 are checked, and it is determined whether or not the assign button 11 has been pressed in S523. As a result of this determination, if the assign button 11 has been pressed, the flow proceeds to S516. On the other hand, as a result of the determination made in S523, if the assign button 11 has not been pressed, simultaneous presses of the menu button 10 and the assign button 11 are not achieved, and thus the flow proceeds to S520 and the second timer is stopped.

In the procedure illustrated in FIGS. 5A and 5B, note that, even when the assign button 11 is long pressed, control of the assign button 11 is not executed until the period of the second timer expires. On the other hand, as described above, a function assigned to the assign button 11 is a function that is executed in response to the release of a single press in some cases. In the case where such a function is assigned to the assign button 11, if a determination of NO is made in S523, the flow may proceed to S515 so that an operation of the function assigned to the assign button 11 is executed even before the period of the second timer expires.

Furthermore, in the case where the period of the first timer has expired erroneously, the operation of displaying or closing the menu screen is merely performed, thus having no significant effect on a subsequent operation step performed by the user. On the other hand, in the case where the period of the second timer has expired erroneously, a function assigned to the assign button 11 is executed, thus possibly having an effect on shooting or the like. Hence, it is desirable that the period of the second timer be longer than the period of the first timer.

As described above, according to this exemplary embodiment, even if either the menu button 10 or the assign button 11 is pressed first, the assign button setting screen can be displayed. Note that, in this case, since control of the assign button 11 is not executed until the period of the second timer expires even if the assign button 11 is operated, the process according to the first or second exemplary embodiment has to be used to suit system requirements.

Other Exemplary Embodiments

In each of the above-described exemplary embodiments, control performed when the menu button 10 and the assign button 11 of the digital video camera 100 illustrated in FIG. 1 are operated is described. On the other hand, the same process can be performed by using an external apparatus connected to the external interface 12. For example, in the case where the display device 200 is connected as an external apparatus as illustrated in FIG. 2, the states of the menu button 210 and the assign buttons 211 are detected, and the control illustrated in FIG. 4 or FIGS. 5A and 5B can thereby be implemented. As another example, in the case where a remote controller can be wirelessly connected as an external apparatus, and where a menu button and an assign button are provided on the remote controller, the digital video camera 100 is notified of operation of each of these buttons, and the control illustrated in FIG. 4 or FIGS. 5A and 5B can be implemented. Additionally, the same applies to the case where the menu button 10 or the assign button 11 of the digital video camera 100 and a menu button or an assign button of an external apparatus are each operated.

Figure 3E:
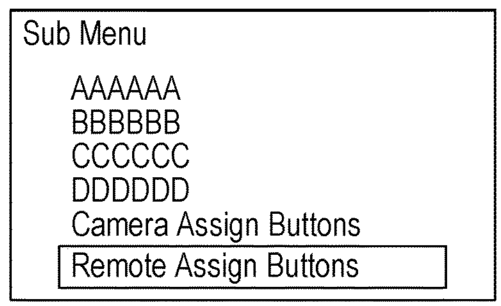

Furthermore, as illustrated in FIG. 3E, in the case where assign button setting is divided into setting for a digital video camera and setting for a remote controller, control may be performed so that a setting screen to be displayed differs according to an assign button being operated. The same applies to the case of the display device 200 illustrated in FIG. 2.

Note that control performed by the system control unit 4 may be performed by one piece of hardware, and control of the entire apparatus may be performed by pieces of hardware taking charge of part of the process.

Although the present disclosure is described in detail on the basis of the desirable exemplary embodiments, the present disclosure is not limited to these particular exemplary embodiments, and various forms made within the scope of the gist of the present disclosure are also included in the present disclosure. Furthermore, each exemplary embodiment described above is merely an exemplary embodiment of the present disclosure, and the exemplary embodiments can be appropriately combined.

In the above-described exemplary embodiments, although the case where the present disclosure is applied to a digital video camera is described as an example, this is not limited to this example, and is applicable to any electronic apparatus including an assign button with which a function can be customized. That is, the present disclosure is applicable to a personal computer, a personal digital assistant (PDA), a mobile phone terminal, a portable image viewer, a printing apparatus including a display, a digital photo frame, a music player, a game console, an electronic book reader, and so forth.

The present disclosure can also be implemented by supplying a program that implements one or more functions in the above-described exemplary embodiments to a system or apparatus via a network or a storage medium, and by causing one or more processors of a computer in the system or apparatus to read and execute the program. Furthermore, the present disclosure can also be implemented by a circuit (an application specific integrated circuit (ASIC), for example) that implements one or more functions.

The present disclosure prevents an operation that a user does not intend to perform from being performed and enables a setting screen for customizing a function of a button to be readily displayed.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-073182, filed Mar. 31, 2015, which is hereby incorporated by reference herein in its entirety.

What is claimed is:

1. An electronic apparatus comprising:

a first type of operation member in which any of a plurality of functions can be registered;

a second type of operation member which is a member different from the first type of operation member, and in which a function is registered in advance;

a registration unit configured to register any of the plurality of functions in the first type of operation member; and a control unit configured to perform control so that a function registered in the first type of operation member is executed based on a fact that the first type of operation member is operated without the second type of operation member being operated, and so that, if the first type of operation member is physically operated simultaneously while the second type of operation member continues to be physically operated after the second type of operation member is physically operated, the function registered in the first type of operation member is not executed, and a setting screen which is a screen on which a function to be registered in the first type of operation member by the registration unit can be selected is displayed.

2. The electronic apparatus according to claim 1, wherein, even if the second type of operation member is operated with the first type of operation member being operated, the setting screen is not displayed.

3. The electronic apparatus according to claim 1, wherein the control unit performs control so that, if the first type of operation member is operated before a certain period has elapsed with the second type of operation member being operated since the second type of operation member was operated, the function registered in the first type of operation member is not executed, and the setting screen is displayed.

4. The electronic apparatus according to claim 3, wherein the control unit performs control so that, if the first type of operation member is operated after the certain period has elapsed with the second type of operation member being operated since the second type of operation member was operated, the setting screen is not displayed.

5. The electronic apparatus according to claim 1, wherein the control unit performs control so that a setting menu screen different from the setting screen and for the electronic apparatus is displayed based on a fact that the second type of operation member is operated without the first type of operation member being operated.

6. The electronic apparatus according to claim 5, wherein the setting menu screen is part of menus of a hierarchy containing the setting screen, and is a screen of a higher-layer menu than the setting screen.

7. The electronic apparatus according to claim 1, wherein the registration unit registers, in response to a fact that a function is selected on the setting screen, the selected function in the first type of operation member.

8. The electronic apparatus according to claim 1, further comprising a plurality of operation members each serving as the first type of operation member, wherein the setting screen is a screen on which a function to be registered in an operated operation member among the plurality of operation members is selected.

9. The electronic apparatus according to claim 1, wherein included among functions that can be registered in the first type of operation member is a function whose execution is started in response to start of operation of the first type of operation member, and whose execution is finished in response to completion of the operation of the first type of operation member.

10. The electronic apparatus according to claim 1, further comprising an image capturing unit, wherein included among functions that can be registered in the first type of operation member is a function regarding image capturing with the image capturing unit.

11. The electronic apparatus according to claim 10, wherein included among the functions that can be registered in the first type of operation member are a function of adjusting focus and a function of adjusting an aperture.

12. The electronic apparatus according to claim 1, wherein each operation member is a button.

13. The electronic apparatus according to claim 12, wherein physical operation of each operation member occurs when each corresponding button is pressed.

14. An electronic apparatus comprising:

a first type of operation member in which any of a plurality of functions can be registered;

a second type of operation member which is a member different from the first type of operation member, and in which a function is registered in advance;

a registration unit configured to register any of the plurality of functions in the first type of operation member; and a control unit configured to perform control so that, if the second type of operation member is operated before a first period has elapsed with the first type of operation member being operated since the first type of operation member was operated without the second type of operation member being operated, a function registered in the first type of operation member is not executed, and a setting screen is displayed, so that the function registered in the first type of operation member is executed in response to a fact that the first period has elapsed with the first type of operation member being operated since the first type of operation member was operated without the second type of operation member being operated, and so that, if the first type of operation member is physically operated before a second period has elapsed with the second type of operation member simultaneously being physically operated since the second type of operation member was operated without the first type of operation member being operated, the function registered in the first type of operation member is not executed, and the setting screen is displayed.

15. The electronic apparatus according to claim 14, wherein the control unit performs control so that, if the first type of operation member is operated after the second period has elapsed with the second type of operation member being operated since the second type of operation member was operated, the setting screen is not displayed.

16. The electronic apparatus according to claim 14, wherein the control unit performs control so that the function registered in the first type of operation member is executed in response to a fact that the first period has elapsed with the first type of operation member being operated without the second type of operation member being operated since the first type of operation member was operated.

17. The electronic apparatus according to claim 14, wherein the first period is longer than the second period.

18. The electronic apparatus according to claim 14, wherein the first operation member and the second operation member are buttons.

19. The electronic apparatus according to claim 18, wherein physical operation of each operation member occurs when each corresponding button is pressed.

20. A control method for an electronic apparatus including a first type of operation member in which any of a plurality of functions can be registered, and a second type of operation member which is a member different from the first type of operation member, and in which a function is registered in advance, the control method comprising:

registering any of the plurality of functions in the first type of operation member; and performing control so that a function registered in the first type of operation member is executed based on a fact that the first type of operation member is operated without the second type of operation member being operated, and so that, if the first type of operation member is physically operated simultaneously while the second type of operation member continues to be physically operated after the second type of operation member is physically operated, the function registered in the first type of operation member is not executed, and a setting screen which is a screen on which a function to be registered in the first type of operation member in the registering can be selected is displayed.

21. A control method for an electronic apparatus including a first type of operation member in which any of a plurality of functions can be registered, and a second type of operation member which is a member different from the first type of operation member, and in which a function is registered in advance, the control method comprising:

registering any of the plurality of functions in the first type of operation member; and performing control so that, if the second type of operation member is operated before a first period has elapsed with the first type of operation member being operated since the first type of operation member was operated without the second type of operation member being operated, a function registered in the first type of operation member is not executed, and a setting screen is displayed, so that the function registered in the first type of operation member is executed in response to a fact that the first period has elapsed with the first type of operation member being operated since the first type of operation member was operated without the second type of operation member being operated, and so that, if the first type of operation member is physically operated before a second period has elapsed with the second type of operation member simultaneously being physically operated since the second type of operation member was operated without the first type of operation member being operated, the function registered in the first type of operation member is not executed, and the setting screen is displayed.

22. A non-transitory storage medium storing a program that causes a computer to execute a control method for an electronic apparatus including a first type of operation member in which any of a plurality of functions can be registered, and a second type of operation member which is a member different from the first type of operation member, and in which a function is registered in advance, the control method comprising:

registering any of the plurality of functions in the first type of operation member; and performing control so that a function registered in the first type of operation member is executed based on a fact that the first type of operation member is operated without the second type of operation member being operated, and so that, if the first type of operation member is physically operated simultaneously while the second type of operation member continues to be physically operated after the second type of operation member is physically operated, the function registered in the first type of operation member is not executed, and a setting screen which is a screen on which a function to be registered in the first type of operation member in the registering can be selected is displayed.

23. A non-transitory storage medium storing a program that causes a computer to execute a control method for an electronic apparatus including a first type of operation member in which any of a plurality of functions can be registered, and a second type of operation member which is a member different from the first type of operation member, and in which a function is registered in advance, the control method comprising:

registering any of the plurality of functions in the first type of operation member; and performing control so that, if the second type of operation member is operated before a first period has elapsed with the first type of operation member being operated since the first type of operation member was operated without the second type of operation member being operated, a function registered in the first type of operation member is not executed, and a setting screen is displayed, so that the function registered in the first type of operation member is executed in response to a fact that the first period has elapsed with the first type of operation member being operated since the first type of operation member was operated without the second type of operation member being operated, and so that, if the first type of operation member is physically operated before a second period has elapsed simultaneously with the second type of operation member being physically operated since the second type of operation member was operated without the first type of operation member being operated, the function registered in the first type of operation member is not executed, and the setting screen is displayed.

* * * * *